(12) United States Patent
Funaki

(10) Patent No.: US 10,532,613 B2
(45) Date of Patent: Jan. 14, 2020

(54) PNEUMATIC TIRE

(71) Applicant: BRIDGESTONE CORPORATION, Chuo-ku, Tokyo (JP)

(72) Inventor: Naoko Funaki, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 832 days.

(21) Appl. No.: 14/773,881

(22) PCT Filed: Mar. 13, 2014

(86) PCT No.: PCT/JP2014/057636
§ 371 (c)(1),
(2) Date: Sep. 9, 2015

(87) PCT Pub. No.: WO2014/142350
PCT Pub. Date: Sep. 18, 2014

(65) Prior Publication Data
US 2016/0023520 A1     Jan. 28, 2016

(30) Foreign Application Priority Data

Mar. 13, 2013 (JP) .................................. 2013-050307

(51) Int. Cl.
*B60C 11/12* (2006.01)
*B60C 11/13* (2006.01)
*B60C 11/03* (2006.01)

(52) U.S. Cl.
CPC ...... *B60C 11/0327* (2013.01); *B60C 11/1307* (2013.01); *B60C 11/1281* (2013.01);
(Continued)

(58) Field of Classification Search
CPC ....... B60C 2011/133; B60C 2011/0381; B60C 2011/036; B60C 11/0309; B60C 11/0316; B60C 11/1307; B60C 2011/0383
See application file for complete search history.

(56) References Cited

U.S. PATENT DOCUMENTS

2010/0252159 A1* 10/2010 Mukai ................. B60C 11/0302
    152/209.25
2011/0005649 A1*  1/2011 Aoki ................... B60C 11/0306
    152/209.1
2011/0005652 A1*  1/2011 Ono .................... B60C 11/0309
    152/209.18

FOREIGN PATENT DOCUMENTS

AU    2012305209 A1    3/2014
CN     101687442 A     3/2010
(Continued)

OTHER PUBLICATIONS

Machine Translation: JP-2012020714-A; Haga, Takashi; (Year: 2018).*

(Continued)

*Primary Examiner* — Kendra Ly
(74) *Attorney, Agent, or Firm* — Kenja IP Law PC

(57) ABSTRACT

A pneumatic tire includes a narrow groove on a tread surface, inclined from the tire circumferential direction, groove width being smaller than groove depth, and an air inflow part opening to the tread surface and formed on one of the opposing groove walls. At least one end of the narrow groove is a terminal end. The air inflow part is disposed at the terminal end of the narrow groove, and in a development plan view of the tread surface, ∠XOY is an acute angle, where O is an intersection between a widthwise center line of the air inflow part and a groove widthwise center line of the narrow groove, X is a terminal endpoint of the air inflow part along the widthwise center line of the air inflow part, and Y is a lengthwise center point of the narrow groove along the groove widthwise center line.

17 Claims, 8 Drawing Sheets

(52) U.S. Cl.
CPC ..... *B60C 11/1323* (2013.01); *B60C 2011/036* (2013.01); *B60C 2011/0339* (2013.01); *B60C 2011/0344* (2013.01); *B60C 2011/133* (2013.01)

(56) References Cited

FOREIGN PATENT DOCUMENTS

| | | | | |
|---|---|---|---|---|
| CN | 103796845 A | 5/2014 | | |
| DE | 102010016906 A1 | * 11/2011 | ........... | B60C 11/032 |
| EP | 0847878 A2 | * 6/1998 | ............ | B60C 11/12 |
| EP | 2154008 A1 | 2/2010 | | |
| EP | 2529953 A1 | 12/2012 | | |
| JP | S59-102409 U | 7/1984 | | |
| JP | 62152902 A | * 7/1987 | | |
| JP | H05-096913 A | 4/1993 | | |
| JP | 2000-264022 A | 9/2000 | | |
| JP | 2003-205706 A | 7/2003 | | |
| JP | 2007-191093 A | 8/2007 | | |
| JP | 2007-230399 A | 9/2007 | | |
| JP | 2009-227264 A | 10/2009 | | |
| JP | 2011-102080 A | 5/2011 | | |
| JP | 2012-001154 A | 1/2012 | | |
| JP | 2012020714 A | * 2/2012 | ......... | B60C 11/0306 |
| WO | 2013/035889 A1 | 3/2013 | | |

OTHER PUBLICATIONS

Machine Translation: DE-102010016906-A1; Lacko Michal; (Year: 2019).*
Machine Translation: EP-0847878-A2; Rodewald Helmut; (Year: 2019).*
Machine Translation: JP-62152902-A; Goto, Yuji; (Year: 2019).*
Jun. 3, 2014 International Search Report issued in International Patent Application No. PCT/JP2014/057636.
Feb. 25, 2014, Notification of Reasons for Refusal issued by the Japan Patent Office in the corresponding Japanese Patent Application No. 2013-050307.
Jun. 3, 2014, Notification of Reasons for Refusal issued by the Japan Patent Office in the corresponding Japanese Patent Application No. 2013-050307.
Sep. 2, 2014, Official Decision of Refusal issued by the Japan Patent Office in the corresponding Japanese Patent Application No. 2013-050307.

* cited by examiner

FLOW RATE [Km/h]

0.0　　　　2.0　　　　4.0

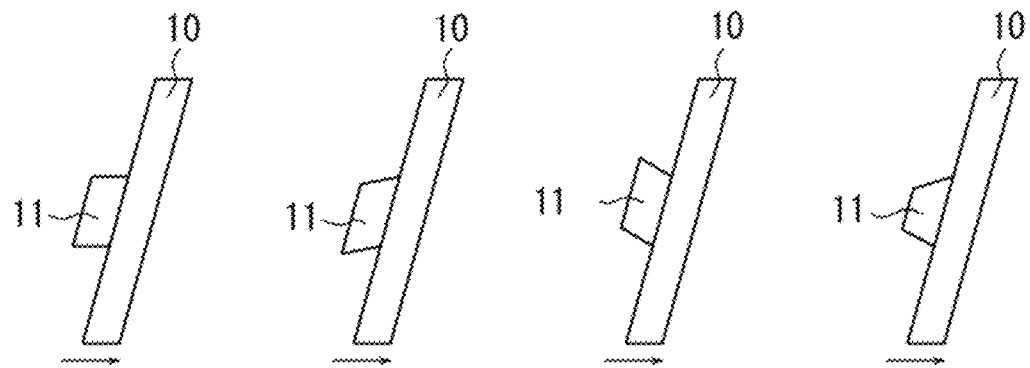
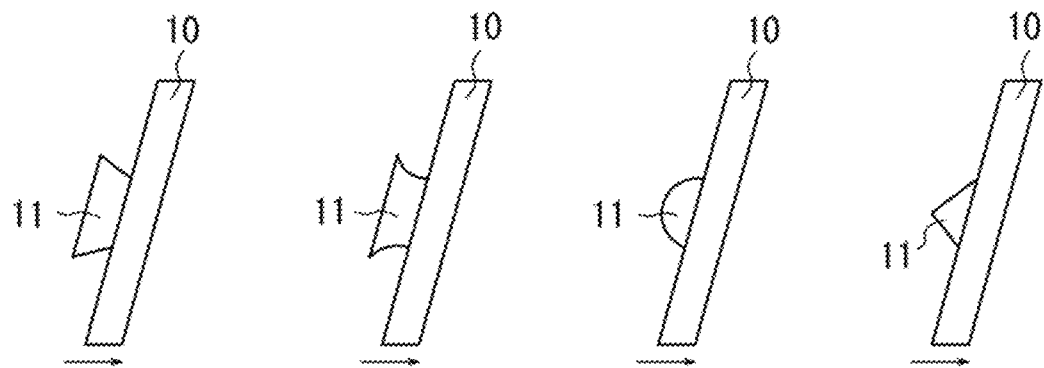

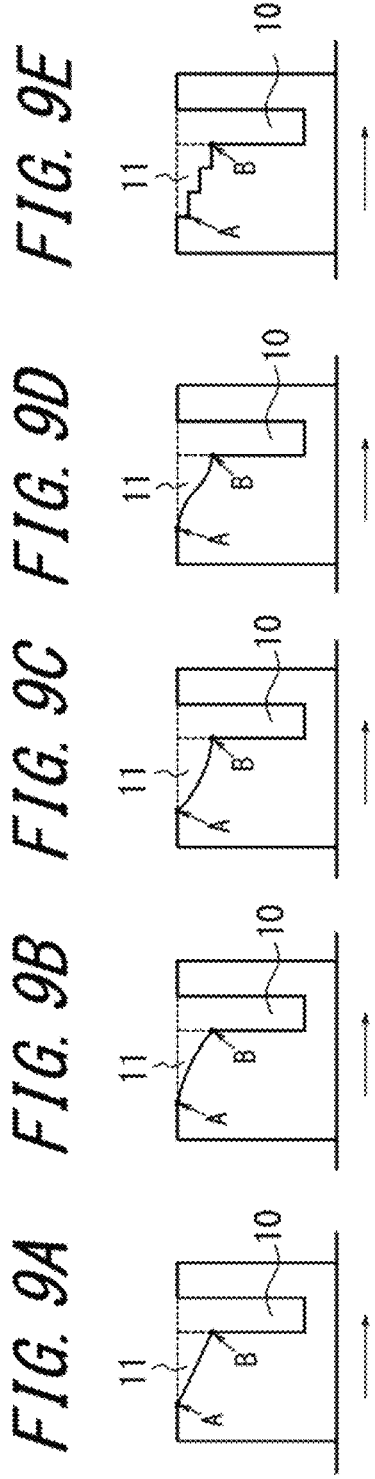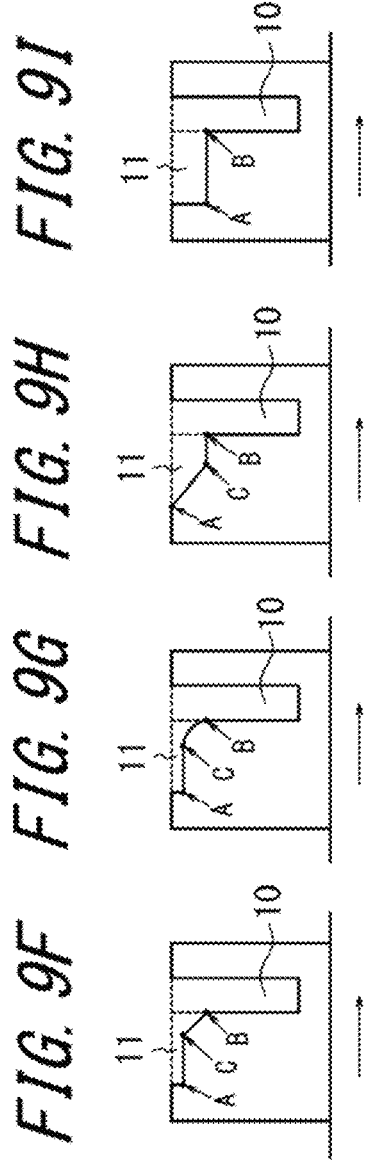

PNEUMATIC TIRE

TECHNICAL FIELD

This disclosure relates to a pneumatic tire with an improved heat dissipation effect in the tread.

BACKGROUND

When a tire rotates with load applied thereon, the tread portion generates heat and reaches a high temperature, which leads to various types of failure such as heat separation of the tread portion. In order to lower the temperature of the tread portion, it is necessary to reduce heat generation or improve heat dissipation.

Conventionally, in order to lower the temperature of the tread portion, one method has been to form grooves in the tread portion, thereby removing tread rubber that is the source of heat generation and increasing the surface area of the tread portion, which increases heat dissipation (for example, see JP 2003-205706 A (PTL 1)).

Another technique for increasing the heat dissipation effect at the tread portion is to provide a small groove extending in a direction that intersects the extending direction of a narrow groove that extends in the tire width direction, so as to disrupt the flow of air that flows in the narrow groove (for example, see JP 2007-230399 A (PTL 2)).

CITATION LIST

Patent Literature

PTL 1: JP 2003-205706 A
PTL 2: JP 2007-230399 A

SUMMARY

Technical Problem

It is difficult, however, for air to flow into a groove that has a narrow width and that extends in the tire width direction. In order to further improve the effect of lowering temperature, it is also necessary to increase the number of grooves, yet increasing the number of grooves leads to a reduction in land portion rigidity, causing wear performance and steering stability to worsen.

Therefore, it could be useful to provide a pneumatic tire that can improve the heat dissipation effect in the tread portion while guaranteeing land portion rigidity.

Solution to Problem

An exemplary pneumatic tire for resolving the above problem includes: a narrow groove formed on a tread surface and extending in a direction inclined with respect to a tire circumferential direction, a width of the narrow groove being smaller than a depth of the narrow groove, at least one end of the narrow groove is a terminal end terminating in a land portion; and an air inflow part opening to the tread surface and formed on at least one of groove walls of the narrow groove that face each other in the tire circumferential direction, wherein the air inflow part is disposed at the terminal end of the narrow groove, and in a development plan view of the tread surface, ∠XOY is an acute angle, where a point O is an intersection between a widthwise center line of the air inflow part and a groove widthwise center line of the narrow groove, a point X is a terminal endpoint of the air inflow part along the widthwise center line of the air inflow part, and a point Y is a lengthwise center point of the narrow groove along the groove widthwise center line of the narrow groove.

Advantageous Effect

According to this disclosure, a pneumatic tire that improves the heat dissipation effect in the tread portion while guaranteeing land portion rigidity can be provided.

BRIEF DESCRIPTION OF THE DRAWINGS

In the accompanying drawings:

FIGS. 8(*a*) to 8(*h*) illustrate modifications to the inflow part; and

FIGS. 9(*a*) to 9(*i*) illustrate modifications to the inflow part.

DETAILED DESCRIPTION

Figure 1A:
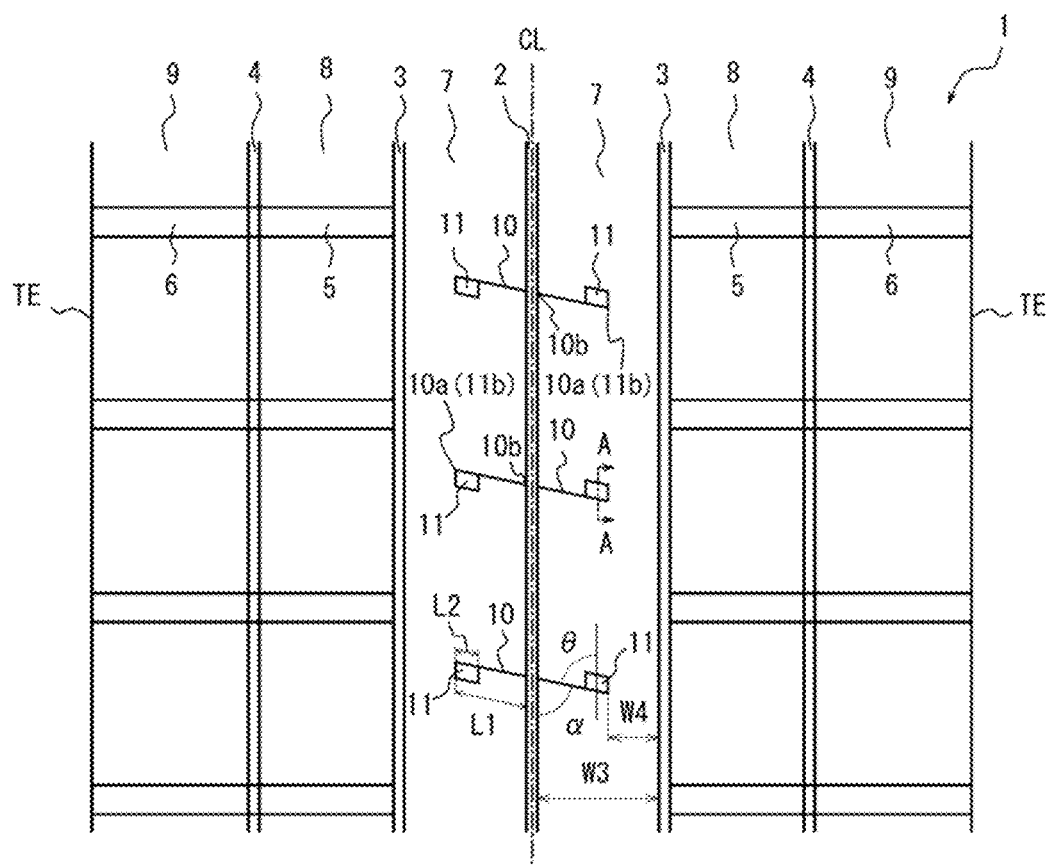
FIG. 1(*a*) is a development view of the tread pattern in a pneumatic tire according to one of the disclosed embodiments, and FIG. 1(*b*) is a cross-sectional diagram along the A-A line in FIG. 1(*a*)

Embodiments will be described below with reference to the drawings.

FIG. 1(*a*) is a development view of an example of the tread pattern in a pneumatic tire according to an exemplary embodiment. The following are formed on a tread surface 1: a central circumferential groove 2 that extends along the tire circumferential direction on the tire equatorial plane CL; a pair of intermediate circumferential grooves 3, one on either side of the central circumferential groove 2, that extend along the tire circumferential direction; a pair of outer circumferential grooves 4 that extend along the tire circumferential direction on the outside, in the tire width direction, of the intermediate circumferential grooves 3; intermediate width direction grooves 5 that extend along the tire width direction and are in communication with the intermediate circumferential grooves 3 and the outer circumferential grooves 4; and outer width direction grooves 6 that extend along the tire width direction, are in communication with the outer circumferential grooves 4, and extend to a tread surface end TE.

A pair of rib-shaped central land portions 7, one on either side of the tire equatorial plane CL, are formed by the central circumferential groove 2 and the intermediate circumferential grooves 3. Block-shaped central land portions 8 are formed by the intermediate circumferential grooves 3, outer circumferential grooves 4, and intermediate width direction grooves 5. Block-shaped outer land portions 9 are formed by the outer circumferential grooves 4 and outer width direction grooves 6. The tread pattern in the diagrams is only an example, and this disclosure is also applicable to a rib-based pattern, a block-based pattern, or any other type of tread pattern. The intermediate width direction grooves 5 and the outer width direction grooves 6 may be inclined with respect to the tire width direction, and the groove width thereof may vary instead of being constant. Furthermore, the outer width direction grooves 6 need not be in communication with the tread surface end TE.

Narrow grooves 10 extending at an inclination with respect to the tire circumferential direction are formed in the rib-shaped central land portions 7. One end 10a of each narrow groove 10 terminates in the rib-shaped central land portion 7, and the other end 10b opens into the central circumferential groove 2. As illustrated in FIG. 1(b), the groove width W1 of the narrow groove 10 in a cross-section along the A-A line of FIG. 1(a) (a cross-section along the tire circumferential direction) is smaller (narrower) than the groove depth D1. In the illustrated example, the groove width W1 is taken as the width in the tire circumferential direction.

In the pneumatic tire of the illustrated embodiment, an air inflow part 11 that opens to the tread surface 1 is formed on one of the groove walls 10c, of the narrow groove, that face each other in the tire circumferential direction. The air inflow part 11 is disposed at the terminal end of the narrow groove 10, and this terminal end terminates in the land portion. In a development plan view of the tread surface, ∠XOY is an acute angle, where a point O is an intersection between a widthwise center line of the air inflow part 11 and a groove widthwise center line of the narrow groove, a point X is a terminal endpoint of the air inflow part along the widthwise center line of the air inflow part, and a point Y is a lengthwise center point of the narrow groove along the groove widthwise center line of the narrow groove. In other words, the widthwise center line of the air inflow part 11 extends from the point X, at which the air inflow part 11 terminates on the tread surface, towards the end 10a of the narrow groove 10 that terminates in the land portion, until reaching a groove wall opening end 11a.

The "extending direction of the narrow groove" refers to the direction in which the groove widthwise center line of the narrow groove extends on the tread surface 1. The "widthwise center line of the air inflow part" refers to the line, along the extending direction of the narrow groove, that traverses the widthwise center of the air inflow part on the tread surface. The extending direction of the air inflow part 11 is defined as the direction in which the widthwise center line extends.

Figure 1B:
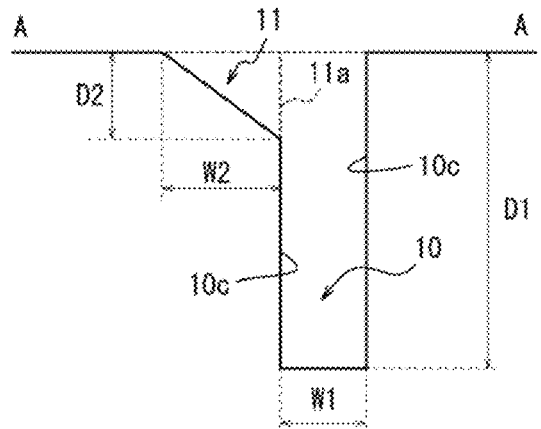

In the example in FIG. 1(a), the air inflow part 11 is disposed so that at the groove wall opening end 11a, an outer end 11b in the extending direction of the narrow groove 10 matches the end 10a of the narrow groove 10 that terminates in the land portion. Furthermore, in the example in FIG. 1(a), the extending direction of the air inflow part 11 is parallel to the tire circumferential direction, and an angle θ enclosed by ∠XOY is equal to an angle α of the narrow groove 10 with respect to the tire circumferential direction.

The arrangement of the narrow grooves 10 in the drawings is only an example. Apart from the rib-shaped central land portions 7, the narrow grooves 10 may also be provided in the block-shaped central land portions 8 and the block-shaped outer land portions 9. The narrow grooves 10 may be inclined at any angle α (0°<α≤90°) with respect to the tire circumferential direction. Furthermore, a plurality of narrow grooves 10 need not be formed to be parallel to each other. Instead of extending in a straight line, the narrow grooves 10 may include a bent or curved portion. While it suffices for at least one end of the narrow groove 10 in the extending direction thereof to terminate in the land portion, from the perspective of guaranteeing rigidity of the land portion, both ends in the extending direction preferably terminate in the land portion.

The effects of this embodiment are now described.

When the tire rotates, wind (air) flows around the tire in the opposite direction from the rotation direction of the tire. By taking this wind into the grooves formed on the tread surface 1, heat dissipates at the tread portion, lowering the temperature of the tread portion. Wind can be taken into the grooves by forming wide grooves on the tread surface 1, yet the land portion rigidity reduces, causing wear performance and steering stability to worsen. On the other hand, upon simply forming grooves narrow enough so as not to reduce the land portion rigidity, wind cannot be taken into the grooves. In other words, the majority of the wind is not taken into the narrow groove 10 formed on the tread surface 1. Rather, only a portion of the wind is taken into the narrow groove 10. The wind that is taken into the narrow groove 10, however, does not reach the groove bottom of the narrow groove 10 and ends up flowing out of the narrow groove 10 after passing through a shallow portion of the narrow groove 10. Therefore, the effect of reducing the temperature of the tread portion is small.

To address this issue, the air inflow part 11 is formed on the groove wall 10c at the windward side of the narrow groove 10. That is, the tire is mounted on a vehicle so that the groove wall 10c on which the air inflow part 11 is formed is windward. The majority of the wind can thus be taken into the narrow groove 10, and the wind taken into the narrow groove 10 can be caused to reach a location near the groove bottom. Furthermore, when the air inflow part 11 is additionally or alternatively formed on the groove wall 10c at the leeward side, wind can be caused to flow out from this air inflow part 11. Since one end 10a of the narrow groove 10 terminates in the rib-shaped central land portion 7, the land portion rigidity can be maintained higher than when, for example, both ends open to the central circumferential groove 2. When the air inflow part 11 is not formed on the groove wall 10c at the leeward side, wind can flow out from both ends of the narrow groove 10.

By forming the air inflow part 11 at the terminal end of the narrow groove 10 so that the above angle θ is an acute angle, the air (wind) flowing in from the air inflow part 11 hits the groove wall at the end of the narrow groove 10 and flows in one direction in the narrow groove towards the end at the opposite side of the narrow groove 10. Hence, air flows over a wide range within the narrow groove 10, achieving a strong heat dissipation effect. When the air inflow part 11 is not disposed at the terminal end of the narrow groove 10 but rather at the lengthwise center position of the narrow groove 10 or near the end at the opposite side from the terminal end (in this example, the end that opens to the central circumferential groove 2), the wind that flows in is dispersed in various directions. The wind thus does not flow in one direction within the narrow groove 10, and the heat dissipation effect might not be sufficiently achieved. Furthermore, if the angle θ is 90° or greater, wind does not easily spread over a wide range within the narrow groove, and the heat dissipation effect might not be sufficiently achieved. The angle θ is preferably 70° or less. This range improves the effect of air inflow from the air inflow part 11 into the narrow groove 10, thereby more reliably improving the heat dissipation effect in the tread portion. When an air inflow part 11 is provided at the groove wall 10c on the leeward side, air that hits the groove wall at the terminal end of the narrow groove 10 can flow out from this air inflow part 11.

In the air inflow part 11 in this disclosure, it suffices for the intersection O to be positioned further towards the end 10a of the narrow groove 10 than the point Y, which is the lengthwise center point of the narrow groove 10. From the perspective of improving the heat dissipation effect, however, the air inflow part 11 is preferably disposed so that the intersection O is positioned, in the extending direction of the narrow groove 10, in a range of 25% or less of the extending direction length L1 of the narrow groove 10 from the end 10a of the narrow groove 10 that terminates in the land portion. At the groove wall opening end 11a, the outer end 11b of the air inflow part 11 more preferably matches the end 10a of the narrow groove 10 completely. The air inflow part 11 is preferably parallel to the tire circumferential direction. This structure improves the effect of air inflow from the air inflow part 11 into the narrow groove 10, thereby more reliably improving the heat dissipation effect in the tread portion.

Even if the air inflow part 11 is sufficiently small with respect to the size of the land portion, the amount of wind in the narrow groove 10 can be greatly increased. Hence, even when forming a sufficient air inflow part 11, the volume of the land portion is not greatly reduced. Therefore, the effect on wear performance and steering stability is small enough to be negligible.

The depth of the air inflow part 11 preferably reaches a maximum at a groove wall opening end 11a that opens to the groove wall 10c of the narrow groove 10. According to this structure, the opening is enlarged, and air flows into the narrow groove 10 more easily. The lateral shape of the air inflow part 11 in a cross-section perpendicular to the extending direction of the narrow groove is preferably such that the depth of the air inflow part 11 gradually increases from the end that is distant from the groove wall opening end 11a where the air inflow part 11 opens to the groove wall 10c of the narrow groove 10 towards the groove wall opening end 11a. According to this structure, the effect of wind inflow can be increased, while suppressing an unnecessary reduction in land portion volume and suppressing degradation of land portion rigidity. The bottom surface of the air inflow part 11 may be either flat or curved. Also, the depth of the air inflow part 11 may increase stepwise towards the groove wall opening end 11a, or the depth of the air inflow part 11 may be constant.

In the case of a directional pattern such that the air inflow part 11 is formed on only one of the groove walls 10c of the narrow groove 10, and all of the air inflow parts 11 are disposed on the same side in the tire circumferential direction, then the pneumatic tire is preferably mounted on a vehicle so that the air inflow parts 11 are disposed at the windward side. From the perspective of convenience, however, the air inflow parts 11 are preferably formed on both of the opposing groove walls 10c of the narrow groove 10, i.e. on the groove walls 10c on both sides. When the air inflow part 11 is only formed on one of the groove walls 10c, it is preferable to adopt a non-directional pattern in which both narrow grooves 10 having the air inflow part 11 on the groove wall 10c on the leeward side and narrow grooves 10 having the air inflow part 11 on the groove wall 10c on the windward side are formed. When the air inflow part 11 is formed on the groove walls 10c on both sides of the narrow groove 10, an air flow forms such that air flows into the narrow groove 10 from the air inflow part 11 formed on the groove wall 10c on the windward side, passes through the narrow groove 10, and escapes from the air inflow part 11 formed on the groove wall 10c on the leeward side.

When the air inflow parts 11 are formed on both of the groove walls 10c of the narrow groove 10, then the center (lengthwise center), along the extending direction of the narrow groove 10, of the groove wall opening end 11a that opens to the groove wall 10c in the air inflow part 11 formed on one of the groove walls of the narrow groove 10 is preferably separated in the extending direction of the narrow groove 10 from the center (lengthwise center), along the extending direction of the narrow groove 10, of the groove wall opening end 11a in the air inflow part 11 formed on the other groove wall of the narrow groove 10, so that the positions of the air inflow parts 11 in the extending direction of the narrow groove do not match. According to this structure, the air flowing in from the air inflow part 11 on the windward side more easily flows through the narrow groove 10 until being discharged from the air inflow part 11 on the leeward side, thereby more reliably improving the heat dissipation effect.

The narrow grooves 10 can be formed at any position in the rib-shaped central land portions 7, but from the perspective of land portion rigidity and the heat dissipation effect, the distance W4 in the tire width direction from the intermediate circumferential groove 3 to the narrow groove 10 is preferably in a range of 5% to 40% of the width W3 of the rib-shaped central land portion 7 in the tire width direction. From the perspective of improving the heat dissipation effect with the air inflow part 11, the narrow groove 10 is preferably inclined with respect to the tire circumferential direction at an angle α of 60° to 90°. The reason is that as the narrow groove 10 is closer to being perpendicular to the direction in which air flows (the tire circumferential direction), a stronger wind hits the groove wall 10c of the narrow groove 10, thereby increasing the cooling effect.

As the narrow groove 10 is deeper and narrower, it becomes more difficult to take wind into the narrow groove 10. Therefore, by providing the air inflow part 11 in the narrow groove 10, which has a narrower groove width W1 than the groove depth D1, the effects of this disclosure are remarkably achieved. As the groove width W1 is larger, it becomes easier to take wind into the groove, yet it becomes more difficult to guarantee land portion rigidity.

Furthermore, by providing an air inflow part 11 with a length that spans the entire extending direction of the narrow groove 10, the land portion volume is unnecessarily decreased, and the land portion rigidity may be reduced excessively. A uniform amount of wind also ends up being taken in across the entire extending direction of the narrow groove 10. It is difficult for this wind to flow within the narrow groove 10, and this wind may be prevented from flowing out of the narrow groove 10. When both ends of the narrow groove 10 terminate within the land portion without opening into a groove, this problem becomes pronounced. Therefore, the air inflow part 11 is preferably provided at a portion of the narrow groove 10 in the extending direction thereof. Specifically, the length L2 of the air inflow part 11 (length along the extending direction of the narrow groove 10) is preferably 5 mm or more to ½ or less of the extending direction length L1 of the narrow groove 10.

The air inflow part 11 becomes smaller as the tread portion wears, and the effect of taking in wind, i.e. the heat dissipation performance, decreases. However, since the amount of heat generated in the tread portion also decreases as the tread portion wears, there is little need for designing the air inflow part 11 in a new pneumatic tire to be particularly large in anticipation of wear.

In an exemplary pneumatic tire, from the perspectives of the cooling effect and of securing land portion rigidity, an air inflow part 11 that opens to the tread surface 1 is preferably formed on at least one of the groove walls 10c of the narrow groove 10 that face each other in the tire circumferential direction, and the maximum depth D1 of the narrow groove 10 and the maximum depth D2 of the air inflow part 11 preferably satisfy the relationship 1≤D1/D2≤15.

When the narrow groove 10 does not communicate with the tread surface end TE, it is difficult for wind to flow within the narrow groove 10, making this disclosure particularly effective.

This disclosure also achieves a remarkable effect in large tires for trucks, buses, construction vehicles, and the like in which heat generated in the tread portion as a result of the large tire size easily becomes problematic. The effects are particularly achieved in a pneumatic tire having an aspect ratio of 80% or less, a rim diameter of 57 inches or more, an overload ability of 60 mton or more, and a load factor (k-factor) of 1.7 or more. In a pneumatic tire for a construction vehicle, the vehicle-side of the tire (the opposite side from the tire ground contact area in contact with the road) is not covered by the vehicle but rather is exposed, making the effects of this disclosure even more prominent.

In a development plan view of the tread, suppose that the distance in the tire width direction between both tread surface ends TE is the tread width, a tire width direction region centered on the tire equatorial plane and occupying 50% of the tread width is a central region, and tire width direction regions on either side of the central region are shoulder regions. When the negative ratio of the central region is less than the negative ratio of the shoulder regions, heat generated in the central region tends to reduce the durability of the tire. In such a tire, a high heat dissipation effect can be achieved and the tire durability can be improved by adopting the narrow grooves and air inflow parts of this disclosure in the central region.

Furthermore, from the perspective of encouraging heat dissipation in the central region, an exemplary pneumatic tire preferably includes a circumferential groove in the central region, in particular positioned on the tire equatorial plane, as in the example in FIG. 1(a). Since it is difficult for wind to flow into the circumferential groove if the groove width of the circumferential groove is 10 mm or less, the heat dissipation effect can be improved by applying this disclosure.

Figure 2A:
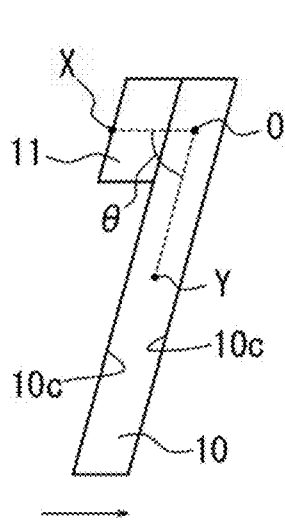
FIGS. 2(*a*) to 2(*e*) illustrate modifications to the air inflow part.
Figure 2B:
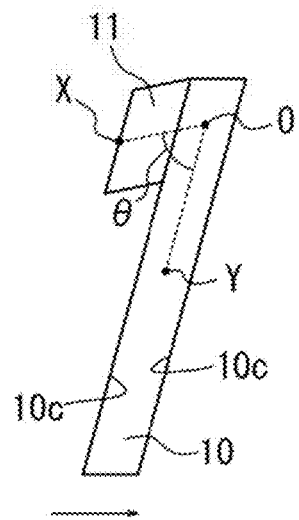
Figure 2C:
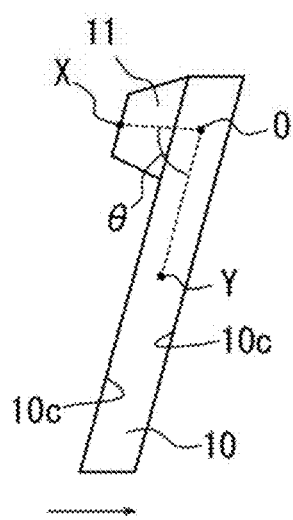
Figure 2D:
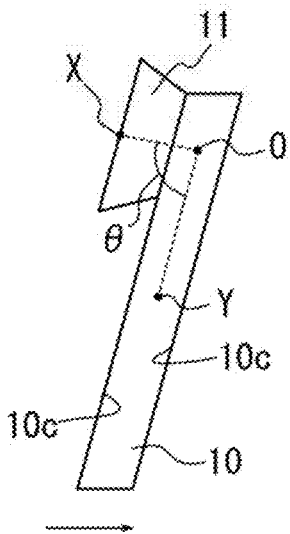
Figure 2E:
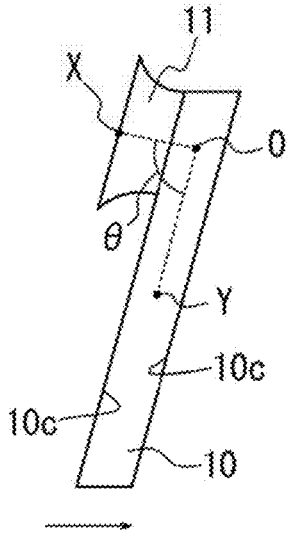

The planar shape of the air inflow part 11 of this disclosure in a tread development view may be a parallelogram in which one set of opposing sides is parallel to the groove walls 10c of the narrow groove 10 and the other set of opposing sides is parallel to the tire circumferential direction, as illustrated in FIG. 2(a), or a parallelogram in which one set of opposing sides is parallel to the groove walls 10c of the narrow groove 10 and the other set of opposing sides is inclined with respect to the tire circumferential direction, as illustrated in FIG. 2(b). The air inflow part 11 may also be a trapezoid in which the bottom opens to the groove wall 10c of the narrow groove 10 and the top is positioned farther from the groove wall 10c of the narrow groove 10, as illustrated in FIG. 2(c), i.e. so that the length in the tire width direction gradually decreases from the groove wall 10c of the narrow groove 10. The air inflow part 11 may also be a trapezoid in which the top opens to the groove wall 10c of the narrow groove 10 and the bottom is positioned farther from the groove wall 10c of the narrow groove 10, as illustrated in FIG. 2(d), i.e. so that the length in the tire width direction gradually increases from the groove wall 10c of the narrow groove 10. The air inflow part 11 may also be like the trapezoid illustrated in FIG. 2(d), but with the two sides other than the top and bottom being curves, as illustrated in FIG. 2(e). The shape of the air inflow part 11 in a development plan view of the tread surface may also be a semicircle or a triangle. The arrows in FIGS. 2(a) to 2(e) indicate the direction of wind (air) flow, which matches the orientation of the tire circumferential direction.

Figure 3:
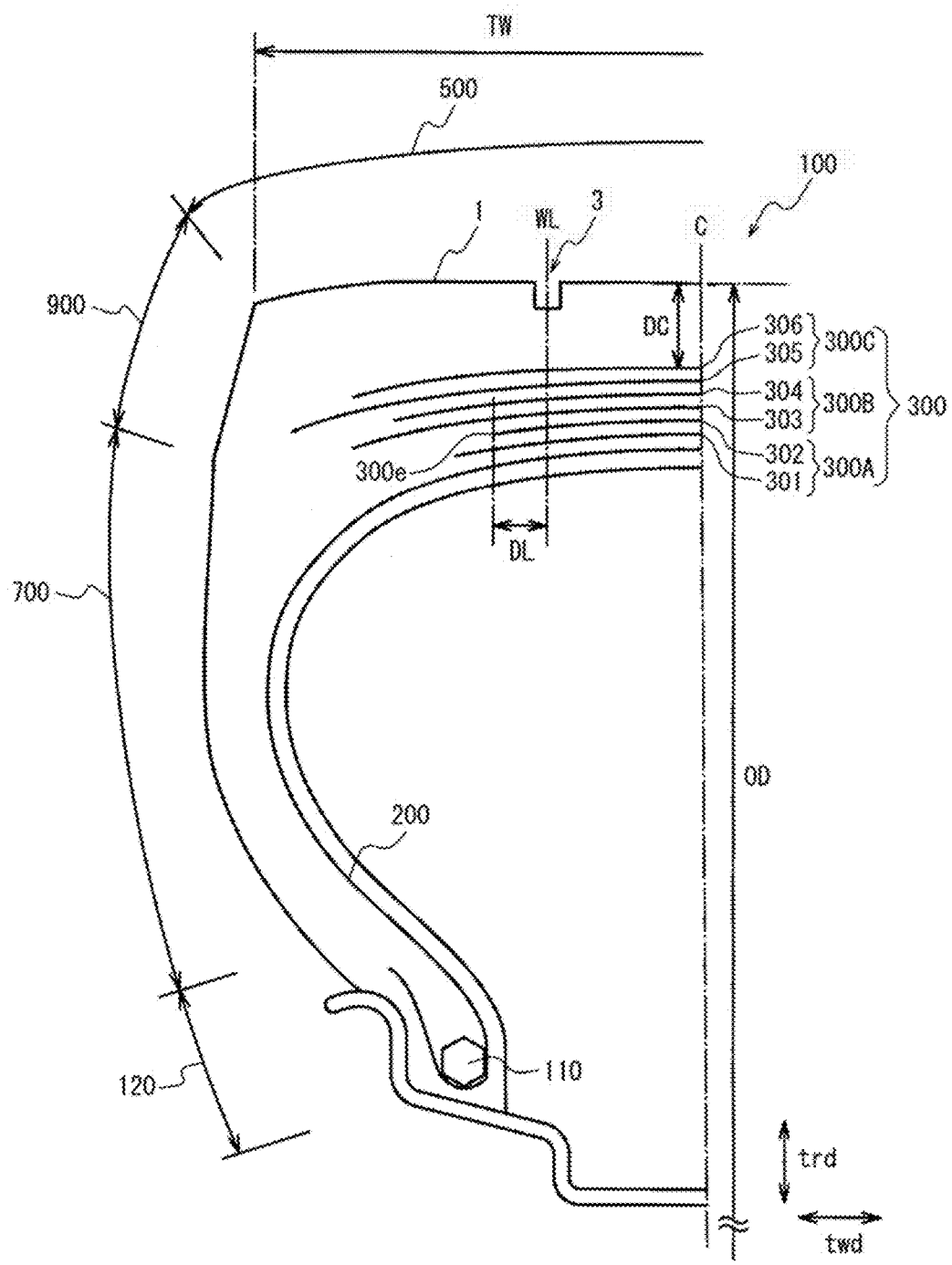
FIG. 3 is a cross-sectional diagram in the tire width direction illustrating the internal structure of a tire according to one of the disclosed embodiments.

FIG. 3 is a cross-sectional diagram in the tire width direction of a pneumatic tire according to one of the disclosed embodiments, in particular illustrating the tire internal structure of a heavy load tire for a construction vehicle or the like. As illustrated in FIG. 3, the rubber gauge (rubber thickness) of a tread portion 500 in this tire 100 is thick as compared to a pneumatic tire mounted on a passenger vehicle or the like. The tire internal structure described below may be adopted in any tire having the tread pattern described with reference to FIGS. 1(a) and 1(b).

Specifically, the relationship DC/OD≥0.015 is satisfied in the tire 100, where OD is the tire outer diameter, and DC is the rubber gauge of the tread portion 500 at a position on the tire equatorial plane C.

The tire outer diameter OD (units: mm) refers to the diameter of the tire 100 in a portion with the maximum outer diameter of the tire 100 (generally, the tread portion 500 near the tire equatorial plane C). The rubber gauge DC (units: mm) refers to the rubber thickness of the tread portion 500 at the position of the tire equatorial plane C. The thickness of the belt 300 is not included in the rubber gauge DC. When a circumferential groove is formed at a position that includes the tire equatorial plane C, the rubber gauge DC is taken as the rubber thickness of the tread portion 500 at a position adjacent to the circumferential groove.

As illustrated in FIG. 3, the tire 100 is provided with a pair of bead cores 110, a carcass 200, and a belt 300 formed by a plurality of belt layers. While only half of the tire 100 in the width direction is illustrated in FIG. 3, the other non-illustrated half of the tire 100 has the same structure.

The bead core 110 is provided in a bead portion 120. The bead core 110 is configured by bead wires (not illustrated).

The carcass 200 forms the skeleton of the tire 100. The carcass 200 is positioned to extend from the tread portion 500 across a buttress 900 and a sidewall 700 to the bead portion 120.

The carcass 200 has a toroidal shape spanning the pair of bead cores 110. In this embodiment, the carcass 200 wraps around the bead cores 110. The carcass 200 is in contact with the bead cores 110. The edges of the carcass 200 in the tire width direction twd are supported by the pair of bead portions 120.

The carcass 200 includes a carcass cord that, in plan view from the tread surface 1, extends in a predetermined direction. In this embodiment, the carcass cord extends along the tire width direction twd. Steel wire, for example, is used as the carcass cord.

The belt 300 is provided in the tread portion 500. The belt 300 is positioned on the outside of the carcass 200 in the tire radial direction trd. The belt 300 extends in the tire circumferential direction. The belt 300 includes belt cords that extend at an inclination with respect to the predetermined direction in which the carcass cord extends. Steel cords, for example, are used as the belt cords.

The belt 300 formed by a plurality of belt layers includes a first belt layer 301, a second belt layer 302, a third belt layer 303, a fourth belt layer 304, a fifth belt layer 305, and a sixth belt layer 306.

The first belt layer 301 is positioned on the outside of the carcass 200 in the tire radial direction trd. The first belt layer 301 is positioned furthest inward in the tire radial direction trd within the belt 300 formed by the plurality of belt layers. The second belt layer 302 is positioned on the outside of the first belt layer 301 in the tire radial direction trd. The third belt layer 303 is positioned on the outside of the second belt layer 302 in the tire radial direction trd. The fourth belt layer 304 is positioned on the outside of the third belt layer 303 in the tire radial direction trd. The fifth belt layer 305 is positioned on the outside of the fourth belt layer 304 in the tire radial direction trd. The sixth belt layer 306 is positioned on the outside of the fifth belt layer 305 in the tire radial direction trd. The sixth belt layer 306 is positioned furthest outward in the tire radial direction trd within the belt 300 formed by the plurality of belt layers. From the inside to the outside in the tire radial direction trd, the belt layers are disposed in the order of the first belt layer 301, second belt layer 302, third belt layer 303, fourth belt layer 304, fifth belt layer 305, and sixth belt layer 306.

In this embodiment, in the tire width direction twd, the width of the first belt layer 301 and the second belt layer 302 (width measured along the tire width direction twd; same holds below) is 25% or more to 70% or less of the tread width TW. In the tire width direction twd, the width of the third belt layer 303 and the fourth belt layer 304 is 55% or more to 90% or less of the tread width TW. In the tire width direction twd, the width of the fifth belt layer 305 and the sixth belt layer 306 is 60% or more to 110% or less of the tread width TW.

In this embodiment, in the tire width direction twd, the width of the fifth belt layer 305 is greater than the width of the third belt layer 303, the width of the third belt layer 303 is equal to or greater than the width of the sixth belt layer 306, the width of the sixth belt layer 306 is greater than the width of the fourth belt layer 304, the width of the fourth belt layer 304 is greater than the width of the first belt layer 301, and the width of the first belt layer 301 is greater than the width of the second belt layer 302. In the tire width direction twd, within the belt 300 formed by the plurality of belt layers, the width of the fifth belt layer 305 is the greatest, and the width of the second belt layer 302 is the smallest. Accordingly, the belt 300 formed by the plurality of belt layers includes a shortest belt layer with the shortest length in the tire width direction twd (i.e. the second belt layer 302).

The second belt layer 302 that is the shortest belt layer has a belt end 300e that is an edge of the second belt layer 302 in the tire width direction twd.

In this embodiment, in plan view from the tread surface 1, the inclination angle of the belt cords of the first belt layer 301 and the second belt layer 302 with respect to the carcass cord is 70° or more to 85° or less. The inclination angle of the belt cords of the third belt layer 303 and the fourth belt layer 304 with respect to the carcass cord is 50° or more to 75° or less. The inclination angle of the belt cords of the fifth belt layer 305 and the sixth belt layer 306 with respect to the carcass cord is 50° or more to 70° or less.

The belt 300 formed by the plurality of belt layers includes an inner intersecting belt group 300A, an intermediate intersecting belt group 300B, and an outer intersecting belt group 300C. The intersecting belt groups 300A to 300C each refer to a group of a plurality of belt layers in which, in plan view from the tread surface 1, the belt cords composing the belt layers within the group intersect between belt layers that are adjacent within the group (preferably with the tire equatorial plane therebetween).

The inner intersecting belt group 300A is formed by a pair of belt layers and is positioned on the outside of the carcass 200 in the tire radial direction trd. The inner intersecting belt group 300A is formed by the first belt layer 301 and the second belt layer 302. The intermediate intersecting belt group 300B is formed by a pair of belt layers and is positioned on the outside of the inner intersecting belt group 300A in the tire radial direction trd. The intermediate intersecting belt group 300B is formed by the third belt layer 303 and the fourth belt layer 304. The outer intersecting belt group 300C is formed by a pair of belt layers and is positioned on the outside of the intermediate intersecting belt group 300B in the tire radial direction trd. The outer intersecting belt group 300C is formed by the fifth belt layer 305 and the sixth belt layer 306.

In the tire width direction twd, the width of the inner intersecting belt group 300A is 25% or more to 70% or less of the tread width TW. In the tire width direction twd, the width of the intermediate intersecting belt group 300B is 55% or more to 90% or less of the tread width TW. In the tire width direction twd, the width of the outer intersecting belt group 300C is 60% or more to 110% or less of the tread width TW.

In plan view from the tread surface 1, the inclination angle of the belt cords of the inner intersecting belt group 300A with respect to the carcass cord is 70° or more to 85° or less. In plan view from the tread surface 1, the inclination angle of the belt cords of the intermediate intersecting belt group 300B with respect to the carcass cord is 50° or more to 75° or less. In plan view from the tread surface 1, the inclination angle of the belt cords of the outer intersecting belt group 300C with respect to the carcass cord is 50° or more to 70° or less.

In plan view from the tread surface 1, the inclination angle of the belt cords with respect to the carcass cord is the greatest for the inner intersecting belt group 300A. The inclination angle of the belt cords of the intermediate intersecting belt group 300B with respect to the carcass cord is equal to or greater than the inclination angle of the belt cords of the outer intersecting belt group 300C with respect to the carcass cord.

The circumferential groove (intermediate circumferential groove) 3 is formed so that the length DL along the tire width direction twd is 200 mm or less. The length DL is the length from the belt end 300e to the innermost position in the tire width direction of a groove widthwise center line WL that traverses the center in the width direction of the circumferential groove 3 in plan view from the tread surface 1 of the tire 100 (i.e. the location of loopback inwards in the tire width direction).

The following describes the effects of the air inflow part 11 in detail with reference to the drawings.

Figure 4A:
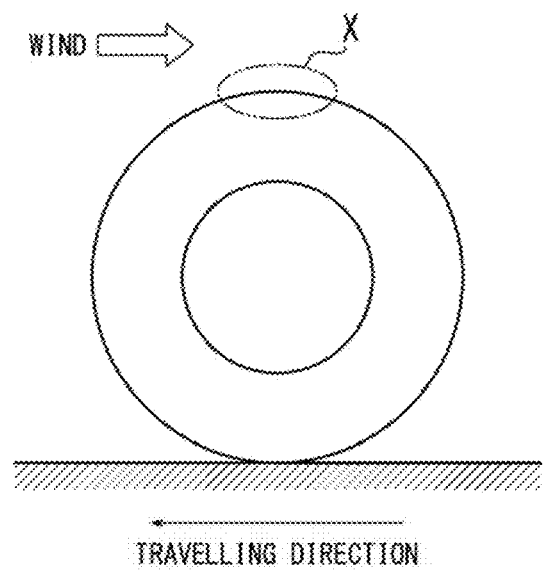
FIGS. 4(*a*) to 4(*c*) illustrate the effect of an exemplary embodiment.
Figure 4B:
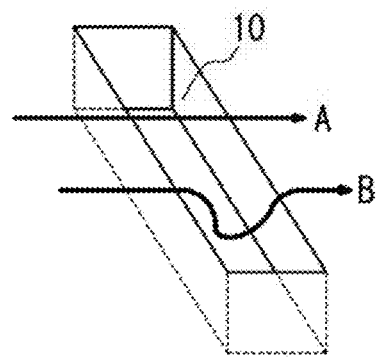

As illustrated in FIG. 4(a), when the tire rotates, wind flows around the tire in the opposite direction from the travelling direction. By taking this wind into the grooves formed on the tread surface 1, heat dissipates at the tread portion, lowering the temperature of the tread portion. Wind can be taken into the grooves by forming wide grooves on the tread surface 1, yet the land portion rigidity reduces, causing wear performance and steering stability to worsen. On the other hand, upon forming grooves narrow enough so as not to reduce the land portion rigidity, wind cannot be taken into the grooves. In other words, the majority of the wind is not taken into the narrow groove 10 formed on the tread surface 1, as indicated by arrow A in FIG. 4(b), which illustrates the portion indicated by the X in FIG. 4(a). Rather, only a portion of the wind is taken into the narrow groove 10, as indicated by arrow B. The wind indicated by arrow B, however, does not reach the groove bottom of the narrow groove 10 and ends up flowing out of the narrow groove 10 after passing through a shallow portion of the narrow groove 10. Therefore, the effect of reducing the temperature of the tread portion is small.

Figure 4C:
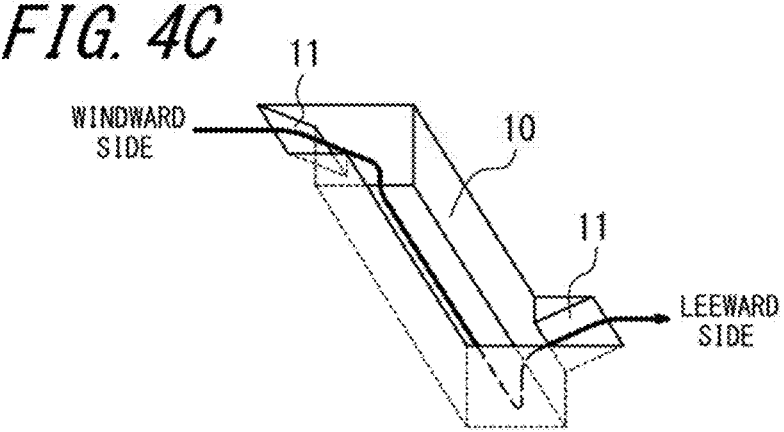

To address this issue, as illustrated in FIG. 4(c), the air inflow part 11 is formed in the groove wall on the windward side of the narrow groove 10. The majority of the wind is thus taken into the narrow groove 10, and the wind taken into the narrow groove 10 reaches the groove bottom. When an air inflow part 11 is also formed in the groove wall on the leeward side, the air can then flow out from this air inflow part 11. Even when an air inflow part 11 is not formed in the groove wall on the leeward side, the wind that has nowhere to go at the end of the narrow groove 10 flows out from the end of the groove wall at the leeward side. Hence, the effect of reducing the temperature in the tread portion can be increased.

In particular, in a pneumatic tire for a construction vehicle, the vehicle-side of the tire indicated by the letter X in FIG. 4(a) (the opposite side from the tread surface) is not covered by the vehicle but rather is exposed, making the effects of this disclosure even more prominent.

Figure 5A:
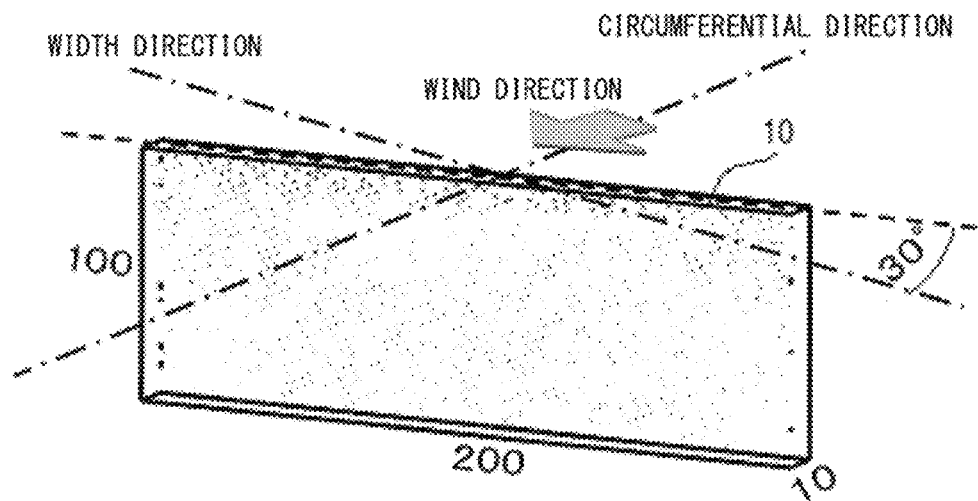
FIGS. 5(*a*) to 5(*c*) illustrate a wind speed vector within a narrow groove.
Figure 5B:
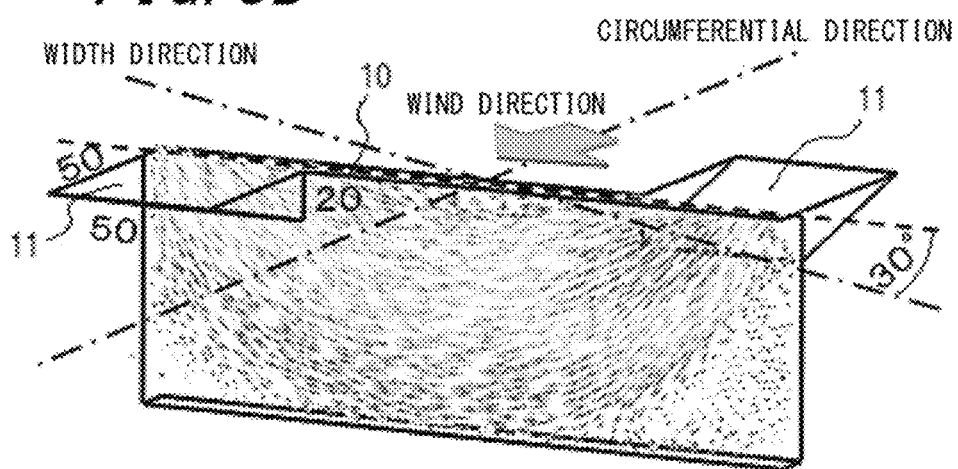
Figure 5C:

With reference to FIGS. 5(a) to 5(c), a numerical analysis of the wind speed vector inside the narrow groove 10 is described.

For a narrow groove 10 inclined at 30° with respect to the tire width direction, FIG. 5(a) illustrates the case of not providing an air inflow part 11, and FIG. 5(b) illustrates the case of providing air inflow parts 11 on both the windward side and the leeward side. FIG. 5(c) illustrates the flow rate. The narrow groove 10 measures 200 mm in the longitudinal direction, 10 mm wide, and 100 mm deep and is inclined 30° with respect to the tire width direction. The air inflow part 11 measures 50 mm long (length along the longitudinal direction of the narrow groove 10), 50 mm wide, and 20 mm thick at the deepest portion.

As illustrated in FIG. 5(a), when not providing an air inflow part 11, it is clear that almost no air is taken into the narrow groove 10.

Conversely, as illustrated in FIG. 5(b), when providing the air inflow parts 11, the wind speed vector reaches a maximum near the air inflow part 11 on the groove wall at the windward side, and wind is taken into the narrow groove 10. It is also clear that near the air inflow part 11 on the groove wall at the leeward side, the wind speed vector increases.

The narrow groove 10 preferably closes upon ground contact. Specifically, the width of the narrow groove 10 is preferably about 10 mm to 20 mm. When the narrow groove 10 closes upon ground contact, the rib-shaped central land portion 6 becomes one continuous land portion. The rigidity of the land portion thus increases, and the wear performance can be improved.

With reference to FIG. 6(a) through FIG. 9(i), the following describes various modifications to the air inflow part 11. The arrows in the figures represent the wind direction.

Figure 6A:
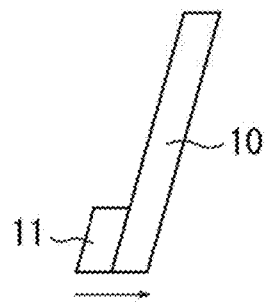
FIGS. 6(*a*) to 6(*c*) illustrate modifications to the inflow part.
Figure 6B:
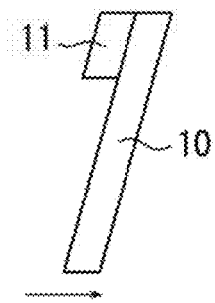
Figure 6C:
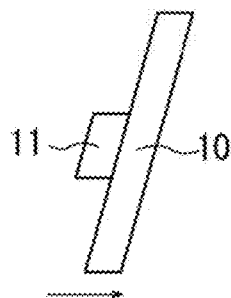

When the narrow groove 10 extends in a direction inclined with respect to the tire width direction, then between the two ends of the narrow groove 10, the air inflow part 11 may be formed on the groove wall at the end that is hit by the wind first, as illustrated in FIG. 6(a), or formed on the groove wall at the end that is hit by the wind last, as illustrated in FIG. 6(b). The air inflow part 11 may also be formed in the central portion of the narrow groove 10, as illustrated in FIG. 6(c).

When the air inflow part 11 is formed on both of the groove walls at the windward side and the leeward side of the narrow groove 10, then the center A, along the longitudinal direction of the narrow groove 10, of the air inflow part 11 formed on one of the groove walls of the narrow groove 10 is preferably separated in the longitudinal direction of the narrow groove 10 from the center B, along the longitudinal direction of the narrow groove 10, of the air inflow part 11 formed on the other groove wall of the narrow groove 10, so that the air inflow parts do not overlap in the tire circumferential direction (the direction from which the wind flows).

Figure 7A:
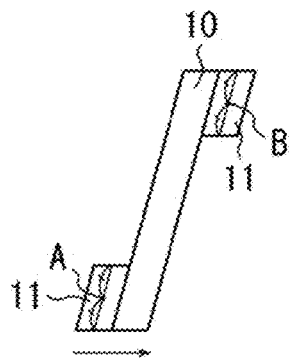
FIGS. 7(*a*) to 7(*e*) illustrate modifications to the inflow part.
Figure 7B:
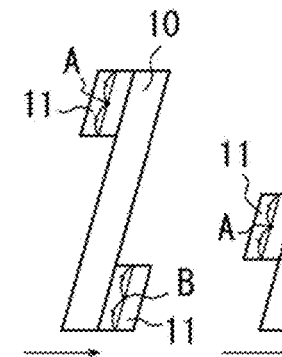
Figure 7C:
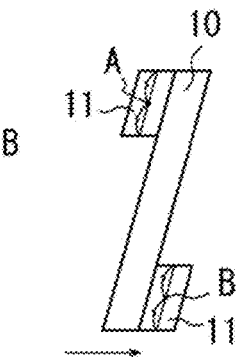
Figure 7D:
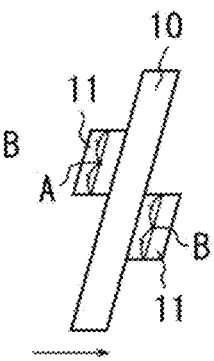
Figure 7E:
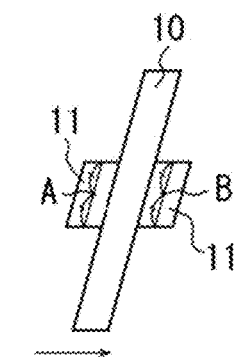

Specifically, the air inflow parts 11 are preferably formed at each end of the narrow groove 10, as illustrated in FIGS. 7(a) and 7(b), or formed to be staggered in the central portion of the narrow groove 10, as illustrated in FIGS. 7(c) and 7(d). The air inflow parts 11 may, however, be aligned in the central portion of the narrow groove 10, i.e. formed without an interval in the longitudinal direction of the narrow groove 10 between point A and point B, as illustrated in FIG. 7(e).

The planar shape of the air inflow part 11 when viewed from the tread surface may be a parallelogram in which one set of opposing sides is parallel to the groove walls of the narrow groove 10 and the other set of opposing sides is parallel to the tire circumferential direction, as illustrated in FIG. 8(a), or a parallelogram in which one set of opposing sides is parallel to the groove walls of the narrow groove 10 and the other set of opposing sides is inclined with respect to the tire circumferential direction, as illustrated in FIGS. 8(b) and 8(c). The air inflow part 11 may also be a trapezoid in which the bottom opens to the wall of the narrow groove 10 and the top is positioned farther from the wall of the narrow groove 10, as illustrated in FIG. 8(d), i.e. so that the length in the tire width direction gradually decreases from the wall of the narrow groove 10. The air inflow part 11 may also be a trapezoid in which the top opens to the wall of the narrow groove 10 and the bottom is positioned farther from the wall of the narrow groove 10, as illustrated in FIG. 8(e), i.e. so that the length in the tire width direction gradually increases from the wall of the narrow groove 10. The air inflow part 11 may also be like the trapezoid illustrated in FIG. 8(e), but with the two sides other than the top and bottom being curves, as illustrated in FIG. 8(f). The air inflow part 11 may also be a semicircle, as illustrated in FIG. 8(g), or a triangle, as illustrated in FIG. 8(h).

As illustrated in FIGS. 9(a) to 9(d), the lateral shape of the air inflow part 11 in a cross-section perpendicular to the longitudinal direction of the narrow groove is preferably such that the depth of the air inflow part 11 gradually increases from the side that is farther from the wall of the narrow groove 10 (point A in FIGS. 9(a) to 9(d)) towards the side that opens to the wall of the narrow groove 10 (point B in FIGS. 9(a) to 9(d)), with the depth of the air inflow part 11 reaching a maximum at the side that opens to the wall of the narrow groove 10. The bottom surface of the air inflow part 11 may be flat, as illustrated in FIG. 9(a), or curved, as illustrated in FIGS. 9(b) to 9(d). The depth of the air inflow part 11 may also increase stepwise from point A to point B, as illustrated in FIG. 9(e). The depth of the air inflow part 11 may also be constant from point A to point C and increase gradually from point C to point B, as illustrated in FIGS. 9(f) and 9(g), or the depth of the air inflow part 11 may increase gradually from point A to point C and be constant from point C to point B, as illustrated in FIG. 9(h). The depth of the air inflow part 11 may also be constant from point A to point B, as illustrated in FIG. 9(i).

EXAMPLES

The following describes a simulation performed using tire models in order to verify the effects of this disclosure. The simulation was performed assuming a heavy load pneumatic tire with a tire size of 59/80R63 for both the Example and the Comparative Example. The maximum depth D1 of the narrow groove 10 and the maximum depth D2 of the air inflow part 11 satisfied D1/D2=5. The dimensions were measured along the tire surface of a pneumatic tire that was mounted on a regular rim with regular internal pressure and no load applied ("predetermined conditions"). The "regular rim" refers to the "standard rim" specified by JATMA, the "Design Rim" specified by TRA, or the "Measuring Rim" specified by ETRTO. The "regular internal pressure" refers to the "maximum air pressure" specified by JATMA, the maximum value of the "TIRE LOAD LIMITS AT VARIOUS COLD INFLATION PRESSURES" specified by TRA, or the "INFLATION PRESSURES" specified by ETRTO.

An Example tire model and Comparative Example tire model were formed to be heavy load pneumatic tires having the tread pattern illustrated in FIG. 1(a), with different values for the angle θ between the air inflow part 11 and the narrow groove 10, and the difference in the heat dissipation effect was examined. Table 1 lists the angle θ in each tire model. The length L1 in the extending direction of the narrow groove 10 was 150 mm, the width W1 of the narrow groove 10 was 20 mm, the length L2 of the air inflow part 11 was 50 mm, the width W2 of the air inflow part 11 was 50 mm, and the depth D2 of the inflow part was 20 mm.

TABLE 1

|  | Comparative Example | Example |
| --- | --- | --- |
| Angle θ (°) | 120 | 60 |
| Heat dissipation effect | 100 | 135 |

Using these tire models, the heat transfer coefficient at the groove bottom was measured by numerical analysis at a main flow speed of 8 km/h. Measurement was performed at the groove bottom of each narrow groove 10. Table 1 lists the measurement results. The results are expressed as an index using Comparative Example as a standard. As the value of this index is larger, the heat dissipation effect is higher.

Table 1 shows that the heat dissipation effect increases significantly when the angle θ is acute (0°≤θ<90°).

INDUSTRIAL APPLICABILITY

This disclosure thus provides a pneumatic tire that improves the heat dissipation effect in the tread portion while guaranteeing land portion rigidity.

REFERENCE SIGNS LIST

1 Tread surface
2 Central circumferential groove
3 Intermediate circumferential groove
4 Outer circumferential groove
5 Intermediate width direction groove
6 Outer width direction groove
7 Rib-shaped central land portion
8 Block-shaped central land portion
9 Block-shaped outer land portion
10 Narrow groove
10c Groove wall of narrow groove
11 Air inflow part
11a Groove wall opening end of air inflow part

The invention claimed is:

1. A pneumatic tire comprising:
a narrow groove formed on a tread surface and extending in a direction inclined with respect to a tire circumferential direction, a width of the narrow groove being smaller than a depth of the narrow groove,
first and second air inflow parts opening to the tread surface and formed on one and the other, respectively, of groove walls of the narrow groove that face each other in the tire circumferential direction, and
a central circumferential groove that is formed on the tread surface and extends along the tire circumferential direction on a tire equatorial plane, wherein
the narrow groove has a first narrow groove portion and a second narrow groove portion,
one end of the first narrow groove portion is a terminal end terminating in a land portion disposed on one side of the central circumferential groove in a tire width direction, and the other end of the first narrow groove portion opens into the central circumferential groove,
one end of the second narrow groove portion is a terminal end terminating in a land portion disposed in on the other side of the central circumferential groove in the tire width direction, and the other end of the second narrow groove portion opens into the central circumferential groove,
the first air inflow part is disposed at the terminal end of the first narrow groove portion and the second air inflow part is disposed at the terminal end of the second narrow groove portion,
in a development plan view of the tread surface, ∠XOY is an acute angle, where a point O is an intersection between a widthwise center line of each of the first and second air inflow parts and a groove widthwise center line of the narrow groove, a point X is a terminal endpoint of each of the first and second air inflow parts along the widthwise center line of each of the first and second air inflow parts, and a point Y is a lengthwise center point of the narrow groove long the groove widthwise center line of the narrow groove,
a length of each of the first and second air inflow parts measured along an extending direction of the narrow groove is 5 mm or more to ½ or less of the extending direction length of the narrow groove,
the maximum depth D1 of the narrow groove and the maximum depth D2 of each of the first and second air inflow parts satisfy the relationship 1<D1/D2≤15,
a center, along a longitudinal direction of the narrow groove, of the first air inflow part is separated in the longitudinal direction of the narrow groove from a center, along the longitudinal direction of the narrow groove, of the second air inflow part,
in a cross-sectional view taken along the tire circumferential direction, a bottom surface of each of the first and second air inflow parts is inclined with respect to the tread surface, and
a length of each of the first and second air inflow parts measured along the tire circumferential direction is larger than the maximum depth D2 of respective one of the first and second air inflow parts.

2. The pneumatic tire of claim 1, wherein ∠XOY is 70° or less.

3. The pneumatic tire of claim 1, wherein the intersection O is positioned, in the extending direction of the narrow groove, in a range of 25% or less of the extending direction length of the narrow groove from the end of the narrow groove that terminates in the land portion.

4. The pneumatic tire of claim 1, wherein an outer end of the air inflow part in the tire width direction matches the end of the narrow groove completely.

5. The pneumatic tire of claim 1, wherein each of the first and second air inflow parts is parallel to the tire circumferential direction.

6. The pneumatic tire of claim 1, wherein the bottom surface of each of the first and second air inflow parts is curved.

7. The pneumatic tire of claim 1, further comprising a pair of intermediate circumferential grooves, one on either side of the central circumferential groove, that are formed on the tread surface and extend along the tire circumferential direction; and a pair of rib-shaped central land portions, one on either side of the tire equatorial plane, that are formed on the tread surface by the central circumferential groove and the intermediate circumferential grooves,
    wherein the distance in the tire width direction from the intermediate circumferential groove to the narrow groove is in a range of 5% to 40% of the width of the rib-shaped central land portion in the tire width direction.

8. The pneumatic tire of claim 1, wherein the narrow groove is inclined with respect to the tire circumferential direction at an angle α of 60° to 90°.

9. The pneumatic tire of claim 1, wherein the narrow groove does not communicate with a tread surface end in the tire width direction.

10. The pneumatic tire of claim 1, wherein the pneumatic tire has an aspect ratio of 80% or less and a rim diameter of 57 inches or more.

11. The pneumatic tire of claim 1, wherein a negative ratio of a central region is less than negative ratios of shoulder regions in the tire width direction.

12. The pneumatic tire of claim 1, wherein a planar shape of each of the first and second air inflow parts in a tread development view is a parallelogram in which one set of opposing sides is parallel to the groove walls of the narrow groove and the other set of opposing sides is parallel to the tire circumferential direction.

13. The pneumatic tire of claim 1, wherein the length of each of the first and second air inflow parts measured along an extending direction of the narrow groove gradually increases from the groove wall of the narrow groove in the tire width direction.

14. The pneumatic tire of claim 1, wherein the relationship $DC/OD \geq 0.015$ is satisfied, where OD is the tire outer diameter, and DC is the rubber gauge of the tread portion at a position on the tire equatorial plane.

15. The pneumatic tire of claim 1, further comprising a pair of intermediate circumferential grooves, one on either side of the central circumferential groove, that are formed on the tread surface and extend along the tire circumferential direction,
    wherein a length from a belt end to an innermost position in the tire width direction of a groove widthwise center line that traverses the center in the tire width direction of each of the intermediate circumferential grooves in a plane view from the tread surface is 200 mm or less.

16. The pneumatic tire of claim 1, wherein the width of the narrow groove is about 10 mm to 20 mm.

17. The pneumatic tire of claim 1, wherein the maximum depth D1 of the narrow groove and the maximum depth D2 of each of the first and second air inflow parts satisfy the relationship $5 \leq D1/D2 \leq 15$.

\* \* \* \* \*